United States Patent
Ho et al.

[11] Patent Number: 5,875,074
[45] Date of Patent: Feb. 23, 1999

[54] ADJUSTABLE HEAD LOADING APPARATUS

[75] Inventors: Bin-Lun Ho, Los Gatos; Vinod K. Rao, Fremont, both of Calif.

[73] Assignee: Quinta Corporation, San Jose, Calif.

[21] Appl. No.: 866,501

[22] Filed: May 30, 1997

[51] Int. Cl.$^6$ .............................. G11B 5/54; G11B 21/21
[52] U.S. Cl. ........................................................... 360/105
[58] Field of Search ............................................. 360/105

[56] References Cited

U.S. PATENT DOCUMENTS

| | | | |
|---|---|---|---|
| 4,535,374 | 8/1985 | Anderson | 360/103 |
| 4,933,785 | 6/1990 | Morehouse | 360/78.04 |
| 5,025,336 | 6/1991 | Morehouse | 360/97.02 |
| 5,034,837 | 7/1991 | Schmitz | 360/105 |
| 5,231,549 | 7/1993 | Morehouse | 360/75 |
| 5,237,472 | 8/1993 | Morehouse | 360/105 |
| 5,239,431 | 8/1993 | Day et al. | 360/98.09 |
| 5,241,438 | 8/1993 | Matsushima | 360/105 |
| 5,285,338 | 2/1994 | Sugahara et al. | 360/105 |
| 5,289,325 | 2/1994 | Morehouse | 360/105 |
| 5,333,085 | 7/1994 | Prentice et al. | 360/104 |
| 5,341,260 | 8/1994 | Jabbari | 360/105 |
| 5,347,414 | 9/1994 | Kano | 360/105 |
| 5,390,060 | 2/1995 | Pecha et al. | 360/105 |
| 5,469,314 | 11/1995 | Morehouse | 360/105 |
| 5,486,964 | 1/1996 | Morehouse | 360/105 |
| 5,550,695 | 8/1996 | Matsumoto | 360/105 |

*Primary Examiner*—Robert S. Tupper
*Attorney, Agent, or Firm*—Fenwick & West LLP

[57] ABSTRACT

A data storage system includes one or more individual ramp faces for each to slidably receive the free end of a tab member connected to one of one or more transducer heads mounted on a head actuator assembly. Each head is disposed to fly in data transfer relationship adjacent to a respective rotating disk surface. Each ramp face is disposed on one of one or more individually adjustable ramp members connected to ramp mounting means. The ramp mounting means, the actuator assembly, heads and the disks are mounted on a rigid base in cooperating relationship. Head actuator assembly positioning means for moving the heads along the disk surfaces positions each head with respect to the corresponding disk surface so the respective tab is in sliding contact with the associated ramp face when the head is to be lifted from the related disk surface. The respective ramp face is arranged so that the corresponding head will be lifted safely from the disk surface to at least a predetermined parking distance as the free tab end slides outward along the respective ramp face. Multiple individual ramp face adjusting means is provided to enable multi-disk/head systems to have minimal wasted disk surface and minimum disk to disk spacing for given actuator/head geometry by adjusting the position of each ramp face with respect to each related head and tab when the actuator positioning means positions the heads at a maximum outer data transfer radius or when the positioning means positions the heads at a minimum disk to head safe displacement spacing.

29 Claims, 6 Drawing Sheets

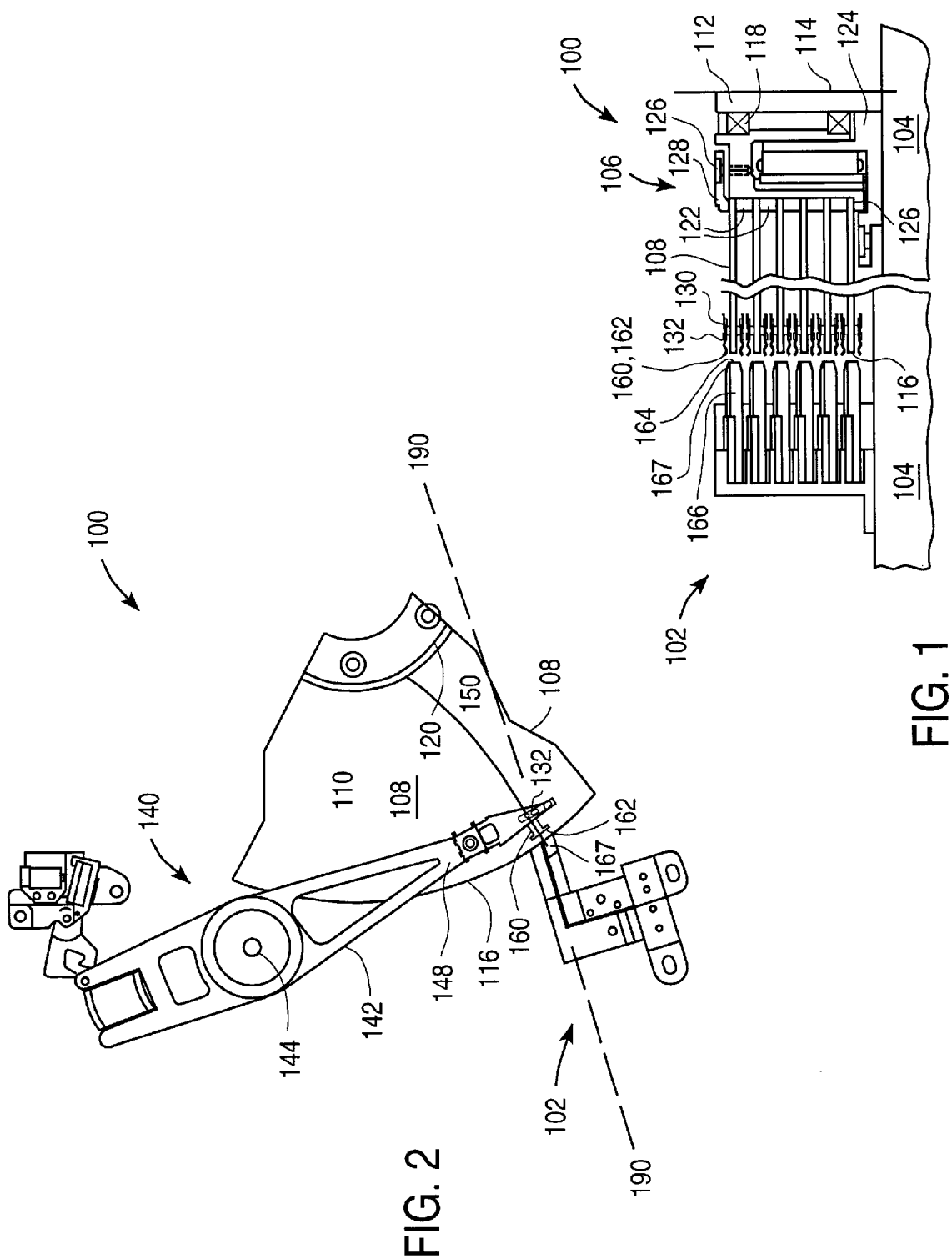

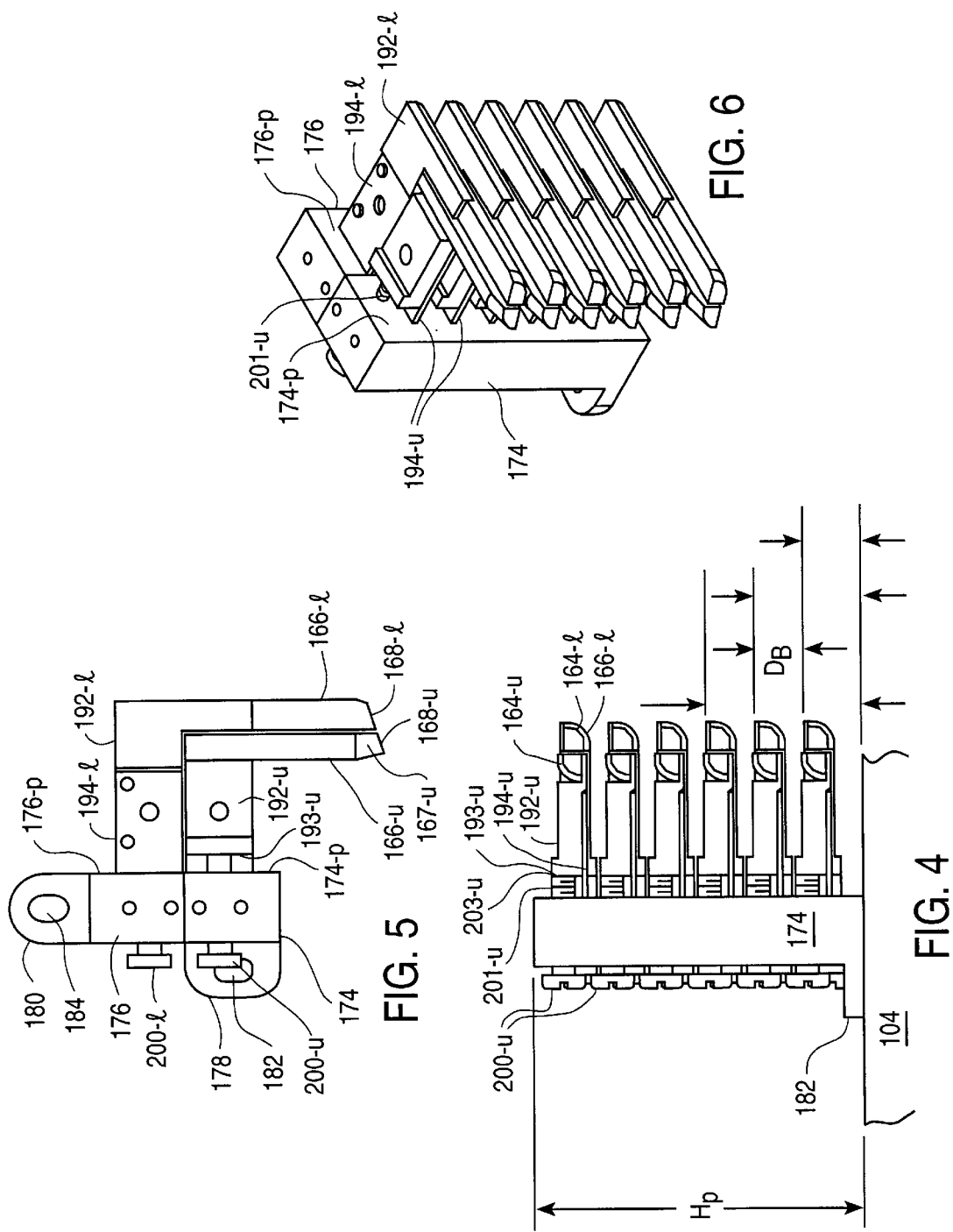

ADJUSTABLE HEAD LOADING APPARATUS

REFERENCES CITED

U.S. Patent Documents

| | | | | |
|---|---|---|---|---|
| 5,034,837 | Jul. 23, 1991 | Schmitz | 360/105 | (Schmitz '837) |
| 5,550,695 | Aug. 27, 1996 | Matsumoto | 360/105 | (Matsumoto '695) |
| 5,231,549 | Jul. 27, 1993 | Morehouse | 360/75 | (Morehouse '549) |
| 4,933,785 | Jun. 12, 1990 | Morehouse | 360/78.04 | (Morehouse '785) |
| 4,535,374 | Aug. 13, 1985 | Anderson | 3601103 | (Anderson '374) |
| 3,786,457 | Jan. 15, 1974 | kahn | 340/174.1 | (Kahn '457) |
| 5,341,260 | Aug. 23, 1994 | Jabbari | 360/105 | (Jabbari '260) |
| 5,239,431 | Aug. 24, 1993 | Day | 360/98.08 | (Day '431) |

CROSS REFERENCE TO RELATED APPLICATIONS

This application claims benefit of commonly assigned Provisional Application Ser. No. 60/044,621, entitled "Adjustable Head Ramp For Storage Drive", filed on Apr. 18, 1997. The subject matter of the aforementioned Provisional Application is incorporated herein by reference.

BACKGROUND OF THE INVENTION

Field of the Invention

The invention relates to a system for loading and unloading heads in a data storage disk drive system.

Background Art

The use of disks for data storage has become widespread in the computer industry. Data can be stored on both sides of a disk in concentric recording tracks. To translate data to and from a spinning disk during read/write operations, at least one transducer is situated within micro inches of a surface of the disk. To accommodate such positioning, transducer is affixed to a specially designed platform connected to a actuator. The platform is aerodynamically designed to fly on a thin cushion of ambient air or gas adjacent to the recording surface that is created by the spinning disk. The air cushion serves to define the clearance between the communicating faces of the transducer/platform combination, hereinafter referred to as a head, and the spinning disk.

Increased head stability minimizes the likelihood of destructive contact between the head and disk, allowing the head to fly closer to the disk surface. As head/disk clearance is decreased, the density of data stored on the disk can be increased.

The head is typically connected to the actuator by some type of flexible linkage or gimbal (flexure) which allows the head to move in roll, pitch and yaw directions relative to the disk to maintain a relatively parallel relationship to the disk surface.

The flexure is typically connected to the actuator by a generally flat, longitudinal arm portion which is rotated or stroked by the actuator parallel to the surface of the disk thereby positioning the head to a target read/write location under control of servo-motor and electronic means. The flexure and arm are configured to provide a spring force to maintain the head the proper distance from the disk under normal spinning conditions.

Designers of disk storage systems have historically been concerned with head to disk contact, either that due to start/stop operation or that caused by physical shock, vibration or acceleration. During normal operation the thin fluid film between the spinning disk and the flying head provides a margin of safety. However, during initial startup, shut down or power loss, when the disk is no longer spinning at high speed, the fluid cushion disappears and the spring force of the flexure and arm urges the head to contact the disk directly, possibly causing data loss, particulate generation and catastrophic damage.

Solutions to these events have taken the form of protective disk coatings; head parking systems that are limited in life (i.e., heads remain in contact with the disk in the power off condition at some dedicated disk area near the hub or perimeter with, for example, 10,000 start/stop cycles); and/or head unloading systems to physically prevent or reduce the possibility of head-disk contact during non-operation. Disk storage systems without head unloading/loading mechanisms also have to deal with the additional start up torque required to overcome stiction between highly polished read/write heads and the exceedingly smooth disks of modern disk storage systems. Head loading/unloading systems typically take the form of dynamic loading systems in which disks are brought up to speed or slowed down with the heads in some relatively remote position horizontally, vertically or both, until the disk speed is fast enough to develop an air cushion, at which time the heads are guided or positioned in normal vertical relationship to the surface of the disk.

Another area of concern for disk storage system design is the aspect of securing the heads after they have been separated from the disks. The following discussion reviews representative solutions of proposed mechanisms for loading/unloading and securing heads with discussion of individual benefits and disadvantages.

Day in patent '431 shows a circumferential flange positioned between oppositely facing magnetic heads to minimize head slap cause by forces parallel to the disk spindle when the heads are in a parked position near the hub. The heads are not positively restrained but are still free to contact the surface of the disks, and the thickness of the flange requires additional spacing be allocated between the disks, thereby decreasing the possible storage density of multi-disk data storage systems.

Jabbari, in patent '260 discloses a staggered ramp assembly which lowers the torque required for unloading the heads from the disks, by separating the ramps for multiple heads into two groups. The inclined sections of the first group of ramps are contacted by a first group of heads, thereby lowering the torque required for lifting the first group of heads by about ½ of that if all heads were lifted at once. After the first group of heads are lifted from the respective disks and the first heads are riding on first ramp flat sections parallel to the disk surfaces, the torque decreases to a lower constant value, resulting from the spring force of the load beams and the friction of the first ramp flat section.

With further outward rotation of the heads, the second group of heads contact the inclined sections of the outward staggered ramps and are similarly lifted from the adjacent disks. Jabbari shows a graph comparing the lower torque requirement of the staggered ramps and discusses the decreased power requirements produced by lower torque. However, the lower torque is accompanied by an increased displacement, which is not discussed. Since mechanical work is the product of force times distance, the total energy required to lift both sets of heads then will be about the same as before. In addition, the staggered ramps require an increased radial spacing bed allocated to accommodate the outward staggered ramps, therefore more disk surface must be dedicated to lifting the heads from the disks, thereby wasting possible data storage surface, and decreasing potential storage density.

Schmitz, in patent '837 describes a head assembly 136, a fixed ramp loading mechanism 134 and a magnetic actuator latching system 122, 123, 114, 124 for a dual disk, four head magnetic drive 100. A pin 114 projecting from a rearward extending end of the actuator 116, magnetically latches with either an inner 122 or an outer 123 recessed circumferential latching surface provided on a magnet plate 123. Latching is provided by means of a lowered permanence path including the pin 114, the plate 124 and the associated voice coil motor magnets 118, 119 and either of surfaces 122 or 123 established when the actuator is at one or the other extreme angular position. The pin 114 and associated latching surfaces provide a means of holding the actuator 116 magnetically fixed when the drive 100 is deactivated or powered down. Either or both the pin 114 or plate 124 may be permanent magnets or have residual magnetism such that attractive magnetic forces will hold the pin 114 against either latching surface 122 or 123 without actively driving current through magnetic holding coils so that the actuator arm is prevented from wandering and exposing the disks and heads to possible damage due to physical shocks.

Although not discussed by Schmitz, it is known that a force is required to move the actuator arm from a latched position when the drive is to be activated. Typically, the force to move the arm from the latched position will come from the actuator coil, in this case coil 120. Therefore the coil 120 must be able to exert enough force to overcome the attractive force holding the pin 114 against surface 112, 123. Since the magnitude of the attractive force is directly related to the amount of resistance to physical shock which the drive can sustain, the coil removing force required will similarly scale upwards as this resistance is increased. Increased resistance to shock damage therefore translates into increased power, size and weight demands on the design of such a magnetically latched drive, including the drive electronics. This becomes increasingly problematic for small, portable drives where the coil size and strength and battery capacity is limited or for drives with many disks having many actuators.

Another consideration for magnetically captured arm/head configurations is controlling the motion of the arm/head once the pin 114 pulls free from the latched position. The torsion applied to the pin and the arm assembly may store elastic energy in the assembly. The large force required to free the arm from its magnetically latched position may cause the arm to jerk free and swing rapidly toward the active disk area. Such a jerk can initiate oscillations in the arm and head due to the resonance's of the long cantilever arm, the flexure and head suspended therefrom. Such oscillations could result in an edge or corner of the head contacting and damaging the disk surface before the arm could be brought under control.

Another problematic aspect of magnetically latched configurations is the influence of the magnetic latch surfaces on the positioning characteristics of the arm assembly. When the arm approaches an extreme position close to the latch surface, although not close enough to be latched, the arm may still be attracted by the magnetic field and therefore non-uniformly influence the torque and position characteristics of the arm. Additional software or hardware must be added to the data storage system in such cases to compensate for the non-uniform characteristics.

Schmitz also describes a physically fixed unloading ramp structure for receiving the heads in a lifted position when the arm is latched. The ramp structure has fixed ramps for each head, each fixed ramp overlapping a portion of the outer perimeter of the respective disk. Since the ramps overlay a portion of the disk perimeter, additional space between adjacent disks must be provided. This is a disadvantage for achieving increase data storage density for multi-disk storage systems.

Another ramp loading and latching mechanism is described by Matsumoto in patent '695. An actuator assembly 25 rotatably mounted on shaft 10 has head arms 26 corresponding in number to magnetic disks 24. A voice coil 27 on the opposite side of head arm 26 from the shaft 10 rotatably drives the assembly 25. Each of the head arms 26 have one or more spring arms 28 extending therefrom, to each of which are mounted at adjacent distal ends, a corresponding magnetic head 29 for reading and writing to data tracks of each side of a respective disk 24 as the heads 29 are positioned to a particular track. At the center of one side of each head 29 there is formed a protrusion 30 for latching with a corresponding recess 46 provided on one end of a corresponding unloading ramp member 12. Each ramp member 12 is circumferentially mounted on a respective cylindrical boss 41 carried on a bearing 44. The bearing 44 is rotatably mounted on a pin 40, the pin 40 fixed to the same base 21 supporting the disks 24 and arms 26. The ramp member 12 is comprised of first and second ramp arms 42 and 43 projecting from the boss 41 in planes parallel to the respective disk.

The arms 42 and 43 are disposed in a V-shape so that a rounded distal end of arm 43 makes abutting line contact with an outer surface of a corresponding head arm 26 when the head 29 and arm 26 is swung sufficiently outward from the center of the disks 24. The V-shape of the arms 42, 43 is arranged so that a slant ramp face 45 on the distal end of arm 42 will come into sliding contact with a respective under side of the associated spring arm 28 thereby lifting the head 29 away from the disk 24 read/write surface as the head arm 26 urges the second arm 43 away from the disks and urges first arm 42 toward the disks about the rotatable axis provided by pin 12. Such rotation continues until the protrusion 30 is engaged with the recess 46.

In this position, the heads 29 are safely separated from the disks 24 read/write surfaces. Suitable springs and stops position the ramp face 45 and the distal end of arm 43 so that the latching and unloading functions do not interfere with the normal operation of the read and write functions of the disk drive.

Provision is made for actuating such separation in case of power loss by utilizing the back EMF of the spindle motor, in the conventional manner. Unloading may also be actuated deliberately by suitable electronic command when preparing for moving or shipping the disk drive.

Again, no discussion is presented of the force necessary to disengage the protrusion 30 from recess 46 in order to move the head 29 from the latched position, and no accounting is made of design limitations imposed by the power demands of the coil 29 (increased amp-turns product, increased coil resistance and consequent voltage requirements, etc.) and magnet assembly or the increased energy drain from the supply. In addition, over time the friction of the protrusion 30 sliding in and out of recess 46 may generate problematic particulate matter which could cause catastrophic data loss.

The structure of '695 provides a semi-positive stop for the latching of the head 29 by the cooperation of spring arm 28, protrusion 30, recess 46 and arms 42, 43. However, the shock resistance of the protrusion 30, recess 46 and spring arm 28 will depend on the relative dimensions and spring force provided. In order to meet severe shock requirements, dimensions and/or spring forces will scale with shock requirements. The negative aspect of this is the increased force necessary to release the protrusion 30 from engagement with recess 46 under spring force from arm 28. High shock resistance will necessitate increasingly powerful actuator coils, magnets and/or larger and heavier components and greater current drain from limited battery supplies. Even so, under sufficient shock the head 29 can still be jarred loose and potentially destroy data on the disk 24.

Additionally, since a portion of the arms 42 and 43 pass over the perimeter of the disks 24 in order to contact the actuator arm 26, additional spacing between adjacent disks must be provided to accommodate the thickness of the arms 42 and 43. Again, this presents a disadvantage for achieving high data storage density.

Morehouse et al., in patent '549 describes a ramp loading and latching system for a multiple disk storage system using fixed ramp-type cam assemblies 42 each having inclined inner ramp face 250 and outer ramp face 254 engaging in portions of associated load beam 224 for loading and unloading heads 230 connected thereto from read/write flying relationship with disks 222. The load beams 224 are part of the actuator assembly 220 having a conventional associated actuator coil, pivot and control. The ramp faces 250, 254 are located within the outer perimeter of the disks 222 thereby taking up some of the potential data storage space of the disk surface. The actuator coil rotates the load beams 224 outward so that the contacting load portions of the beam 224 rides up the first inclined surface 250 that separates the head assembly 230 from the disk 222. Further outward rotation of the load beam 224 causes the load beam to ride down the oppositely sloped outward ramp 254 to be captured on a flat surface 244 of the ramp assembly 42.

The system of '549 has similar characteristics of shock resistance, power supply and particulate considerations as Matsumoto '695 described above. Also, '549 has the disadvantageous loss of potential data storage area at the perimeter of the disks. In addition, higher loading/unloading friction forces are required for a given head to disk positioning spring force, since the loading portions of the load beam 224 are located nearer the midpoint of the beam than the head end. This translates into increased power, size and weight for the drive components and decreased battery life for portable drives.

Patent '374 by Anderson et al., describes a radially directed head loading apparatus 10 having an electrically controlled linear actuator 23, carrying a support arm 26 for positioning a Whitney-type suspension arm 28 and Whitney-size head 36. The suspension 28 creates a resilient, spring-like attribute to support the head 36 in read/write relationship to a disk 18 in normal operation.

A triangular, two sided, longitudinal ramp portion 44 is disposed along one face of the arm 28, and rides on a stationary circular cam 50. The ramp portion 44 is comprised of a first section 46 and a second section 48. The two sections are inclined and positioned with respect to the arm 28 and cam 50 so that the head 36 will gently approach and retreat vertically from the disk 18 as the arm 28 is actuated toward and away from the center of the disk 18 between normal operation and non-operation.

No discussion is provided on how the actuator 23 is secured during power off or inactive conditions to prevent the arm from projecting the head into a possible head-disk contact situation. For multiple head/disk systems, the size, cost and weight of multiple linear actuators with the associated power and thermal dissipation requirements may also be problematic.

Patent '457 by Kahn also discloses a radially directed, linear actuated arm 14a with a ramp 30 contacting a fixed cam 32 for vertically displacing a head 28 from a disk 26 during unloading. The method of securing the arm 14 in the unloaded position is not discussed.

All of the head loading/unloading assemblies for the disk data storage systems surveyed are fixed structures with a the relative position of each head unloading ramp of cam to an associated disk surface is set by the design dimensions of the individual components supporting the ramp or cam and the disk, i.e., the disk thickness, disk spindle and spacer dimension and placement accuracy, the relative height of the support for the cam and ramp relative to the disk surfaces, the thickness and positioning accuracy of any mounting plates and brackets and the like. All of the mechanical components of the drive that determine the relative position of the head unloading mechanism to the disk contribute to imprecision due to the build up of machining tolerances.

Most prior art ramp loading/unloading systems have the ramps partially extending into the perimeter of the disks. This makes removable disk cartridges problematic, unless the ramp assemblies are designed to be radially movable or dedicated in the removable cartridge, neither of which are preferred, from cost and manufacturability considerations.

Component tolerances contribute to wasted disk storage space in two ways. First, the inaccuracy of the lateral position of the ramp and cam of one arm relative to another, contribute to a build up of lateral or horizontal tolerances (i.e., parallel to the disk surfaces) that cause wasted data tracks on the perimeter of the disks, where radial space is most valuable. Secondarily, in the build up of tolerances vertically, in the spindle axis direction. The tolerances of each ramp, arm, head and disk combination build up with multiple disks along the spindle axis direction. This wastes potential data storage density in the vertical direction. Also, vertical tolerances acting through the angled surface of the ramp causes a horizontal tolerance of the load point.

None of the systems surveyed have addressed the issue of component tolerances and their effect on minimizing the spacing of multiple disks or the reduction of wasted data tracks to achieve higher data storage density. It is clear that disk data storage systems comprised of mechanical components whose relative positions are determined by the build up of machining tolerances, will have to have the disks spaced further apart than might otherwise be preferred and will have more wasted data tracks than desired.

It is known to use shims for adjusting the position of one mechanical component relative to another. However, for multiple disk systems, this rapidly becomes impractical for high volume manufacture of a storage system comprised of more than 2 disks.

There is a need for an unloading/loading and latching system which addresses these issues in an effective manner.

SUMMARY OF THE INVENTION

It is an object of the present invention to provide a head loading/unloading system which minimizes inter-disk spacing in multiple disk data storage systems.

It is also an object of this invention to provide a head loading/unloading system which minimizes wasted data tracks at the perimeter of the disks.

It is yet another object of the present invention to provide means for easily compensating for the build up of manufacturing tolerances of the head, disk and loading/unloading mechanism in multiple disk data storage systems.

It is still another object of the present invention to restrain the heads in a displaced head to disk relationship which minimizes the probability of generation of particulate matter during a transition from an unloaded to a loaded position.

Another objective of the present invention is to provide a head unloading/loading system amenable to inclusion in removable disk drive cartridges.

An advantage of the present invention is the design freedom provided for selection of recording media, since head/disk contact does not occur at any point in normal operation, or normal or power off shutdown. Special anti-friction, anti-wear or lubrication coatings are not necessarily required. Problems of head/disk stiction with the attendant required increase in actuator motor power are eliminated.

BRIEF DESCRIPTION OF THE DRAWINGS

For a further understanding of the objects and advantages of the present invention, reference should be had to the following detailed description, taken in conjunction with the accompanying drawings, in which like parts are given like reference numerals and wherein:

FIG. 1 shows an elevation view of a representative multi-disk data storage system incorporating an embodiment of the present invention;

FIG. 2 illustrates a plan view of the multi-disk version of the data storage system shown in FIG. 1;

FIG. 4 is an elevation view of a first set and second set of ramps of the ramp loading/unloading assembly of in FIG. 3 in accordance with the present invention;

FIG. 5 is a top plan view of the first and second set of ramps of the ramp loading/unloading assembly shown in FIG. 4;

FIG. 6 is an opposite perspective view of the ramp loading/unloading assembly shown in FIG. 3;

DETAILED DESCRIPTION OF A PREFERRED EMBODIMENT OF THE INVENTION

Figure 3:
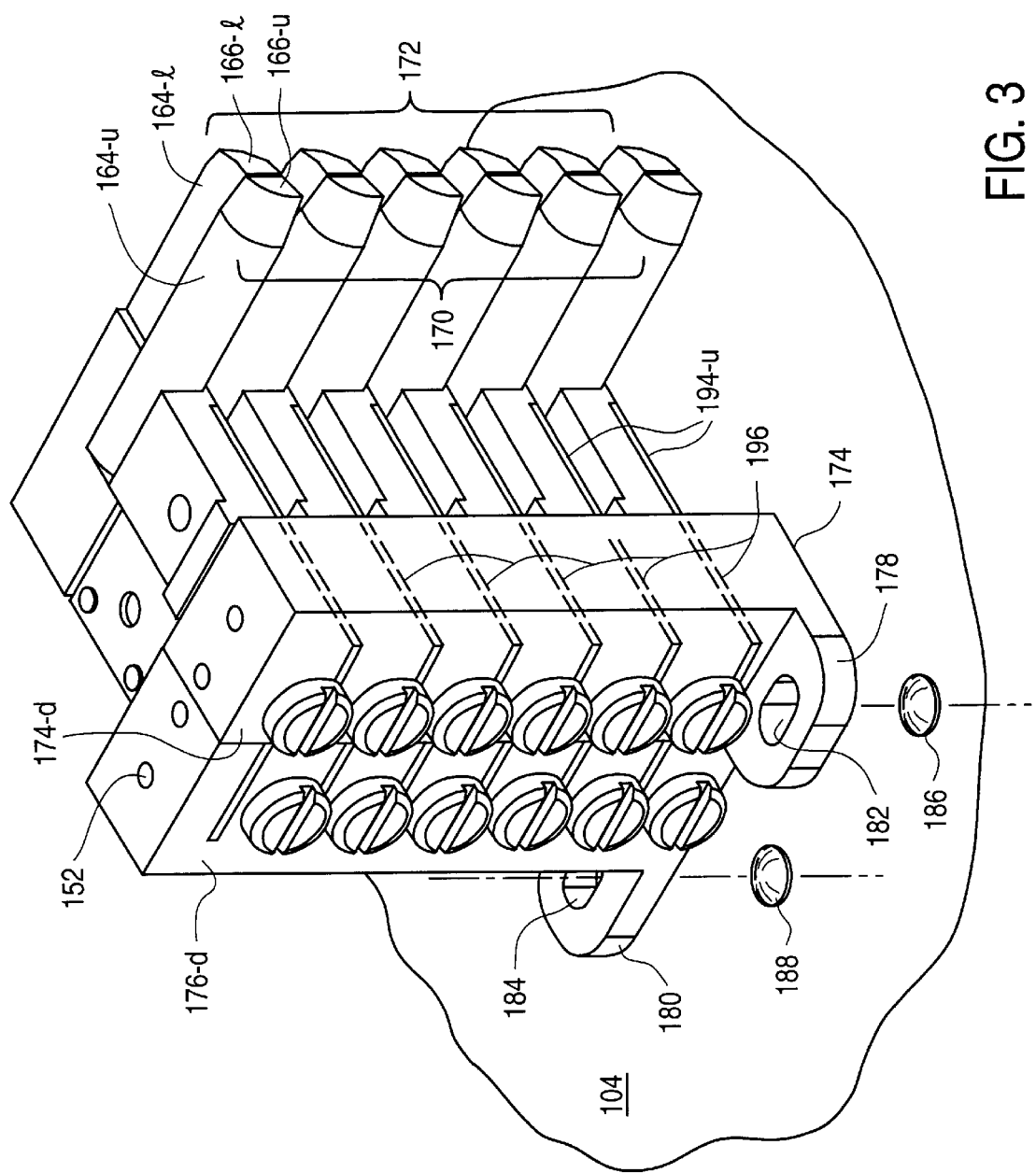
FIG. 3 is an expanded perspective view of one embodiment of an individually adjustable ramp loading/unloading assembly for the multi-disk data storage system of FIG. 1 in accordance with the present invention.
Figure 7:
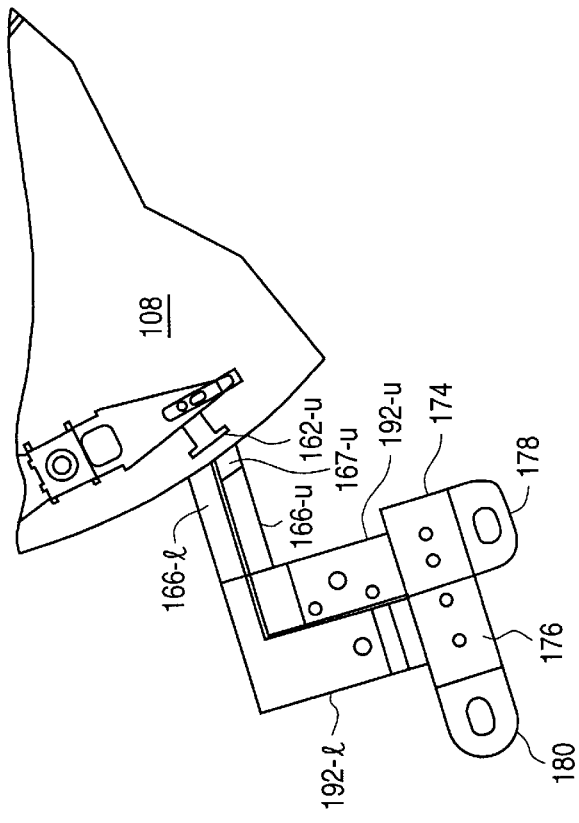
FIG. 7 is a more detailed elevation view of a portion of the ramp assembly and disks of FIG. 1.
Figure 8:
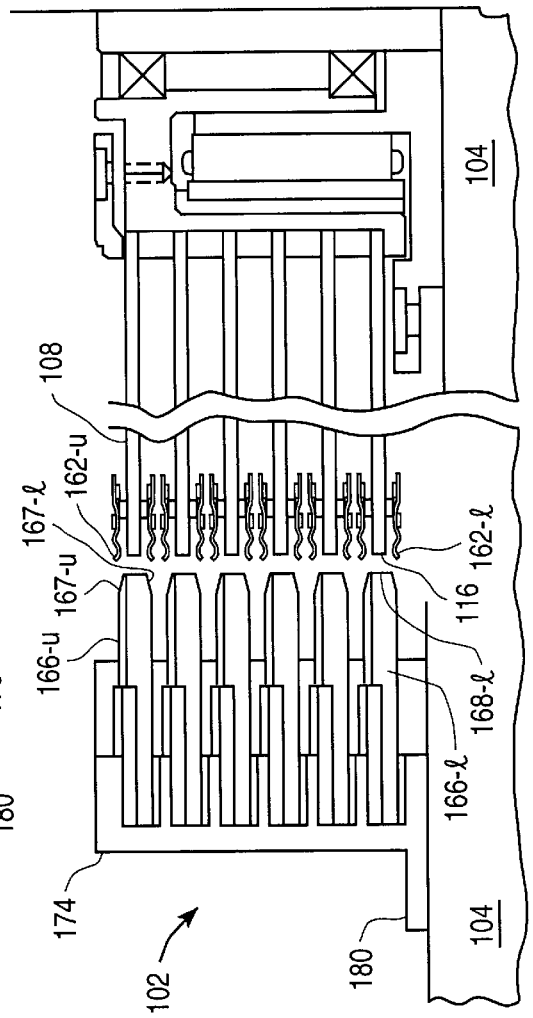
FIG. 8 is a magnified plane view of the ramp assembly and a portion of one head/disk pair of an embodiment of the invention.

With reference to FIG. 1, there is shown a representative multi-disk data storage system indicated generally by numeral 100 incorporating a first embodiment of an adjustable head loading/unloading ramp assembly 102 in accordance with the present invention. The multi-disk data storage system 100 includes a base 104 having a multi-disk rotor assembly 106 and the ramp assembly 102 mounted thereon in adjacent relationship.

In the ensuing discussion, the adjectives upper and lower will be used to designate the spatial relationship between related elements having a spaced relationship relative to the same side of the base 104, in which the word upper indicates more distant spacing than the word lower. In similar fashion, where pairs of elements have spaced relationship relative to the base 104, the suffixes -u and -l will indicate elements having such spatial relationship relative to the base 104.

The disk assembly 106 includes a plurality of two sided disks 108 of thickness, Td. Each side of each disk 108 (i.e., the upper and lower sides) is provided with a planar disk data storage media surface 110 separated by disk spacing distance, Dd (except for the upper- and lower-most disks).

The disks 108 are centrally mounted on spindle 112 having central axis 114 projecting upwardly from the base 104. The disks 108 extend radially outward from axis 114 to a circular perimeter 116. The disks 108 are rotatably driven by a centrally located rotary motor 118 enclosed in rotor body 124. The rotor body 124 is of cylindrical symmetry disposed to rotate freely about the spindle 112. Inner perimeters 120 of the disks 108 are mounted and axially spaced apart between successive pairs of adjacent annular spacing rings 122. The rings 122 are circumferentially aligned and supported by an outer circumference of rotor body 124. The disks 108 and rings 122 are secured to the rotor body 124 with an axial compression force between a lower annular compression rim 127 provided by fasteners 126 holding an upper annular compression cap 128 against the upper surface 110 of the uppermost disk 108.

The fasteners 126 may be a plurality of threaded screws engaged in axially aligned bore holes provided in the upper portion of the rotor body 124, or alternatively may be a compression cap having an inner annulus with threads engaged on matching circumferential rotor body threads (not shown).

A plurality of upper and lower transducer heads 130-u, 130-l are disposed in spaced apart relationship to the respective disk surfaces 110-u, 110-l, one head 130 to each disk surface 110; i.e., an upper head 130-u for the top surface 110-u and a lower head 130-l for the bottom surface 110-l of each disk 108. Each head 130-u, 130-l is mounted on a respective suspension 132-u, 132-l connected to an actuator assembly (not shown) to fly above the surface of the respective disk surface 110-u, 110-l. The relationship between heads 130-u, 130-l, suspension 132-u, 132-l and the actuator assembly will be described in more detail below.

With reference to FIG. 2, the ramp assembly 102 is mounted radially outward with respect to the perimeter 116 of the disks 108. An actuator assembly 140 carrying a plurality of upper and lower actuator arms 142-u, 142-l (the uppermost one shown in FIG. 2) is also disposed radially outward with respect to the outer perimeter 116 of the disks 108. Assembly 140 is pivotally mounted to the base 102 by upwardly projecting pivot 144 and supports the plurality of arms 142-u, 142-l to pivot in planar relationship to the disks 108, with one arm for each corresponding disk surface 110-u, 110-l. Each actuator arm 142-u, 142-l has a respective head arm 146-u, 146-l extending distally from the pivot 144. One or more coil arms 148 extend distally in opposite radial directions from the pivot 144. The distal end of head arm 146-u, 146-l supports the respective distal head 130-u, 130-l by the corresponding upper and lower suspension 132-u, 132-l connected therebetween. Each head arm 146-u, 146-l is disposed to swing the corresponding head 130-u, 130-l toward and away from the central axis 114 from one end of a corresponding semicircular arc 150 proximal to the inner perimeter of the disks 108 to a distal end of the arc at the outer perimeter 116 of the disks. The coil arm or arms 148 are fitted with a voice coil 149 and associated conductor winding ends (not shown). The coil arm 148 distal end and voice coil 149 are configured in a conventional manner to electromagnetically engage a magnetic field (not shown) of a sector magnet (not shown) for controlling the angular position of the actuator arms 142-u, 142-l with respect to the pivot 144, and thereby the position of the heads 130-u, 130-l on the respective surfaces 110-u, 110-l of disks 108.

A loading/unloading tab 160-u, 160-l is coupled with a respective head 130-u, 130-l through a respective suspension 132-u 132-l. Each tab 160-u, 160-l extends radially outward from the respective suspension 132-u 132-l a distance, Tl, to a respective free tab end 162-u, 162-l. A respective free end 164-u, 164-l of a corresponding longitudinal ramp bar 166-u, 166-l is aligned with each respective free tab end 162-u, 162-l. Each longitudinally extending ramp bar 166-u, 166-l is mounted in spaced apart relationship on the ramp assembly 102, projecting generally inward therefrom. Each ramp bar 166-u, 166-l is mounted on the ramp assembly 102 to extend generally parallel to a respective tangent 190 to the distal end of the semicircular arc described by the corresponding head 130-u, 130-l as it swings on the corresponding arm 142-u, 142-l parallel to the respective surfaces 110-u, 110-l of disks 108. Each bar free end 164-u, 164-l has a free end face 168-u, 168-l which is angled and aligned to closely approach, but not touch, the outer perimeter 116 of the associated disk 108. The spacing of the free end face 168-u, 168-l from the disk perimeter 116 is set by the appropriate dimensions of the ramp assembly 102 and the mounting accuracy thereof on the base 104.

With respect to FIG. 3 through FIG. 9, the cooperation of the tab 160-u, 160-l and associated ramp bar 166-u, 166-l will now be described along with the appropriate dimensions and spacing of the cooperating elements. FIG. 3 shows in greater detail, the ramp assembly 102 showing an upper set 170 of spaced apart upper ramp longitudinal bars 166-u, and a lower set 172 of spaced apart lower ramp longitudinal bars 166-l. The upper and lower sets 170, 172 are mounted on respective upper support pedestal 174 and lower support pedestal 176. The pedestals 174 and 176 project perpendicularly and upward from the base 104 by mounting means described below.

The ramp bars are arranged in pairs, each pair 166-u and 166-l spaced above the base 104, in adjacent pairs, at progressively higher elevations, viz, H1, H2, H3, (FIG. 4) and continuing by regular spacing interval, Db. The location of the bar pairs is arranged to align with the upper and lower disk surfaces of related disks when mounted on base 104. Corresponding disks 108, are spaced and aligned along the spindle 112 (FIG. 1) in matching relationship.

The free ends 164-u and 164-l of each of the respective upper ramp bars 166-u and lower ramp bars 166-l each extend longitudinally from a respective distal end. The respective distal end of each bar is connected to and laterally spaced away from the respective upper ramp set pedestal 174 and lower ramp set pedestal 176 by laterally extending connecting ramp bar brackets 192-u and 192-l. Each bar bracket 192-u, 192-l has a proximal end integrally connected to the respective distal end of the respective bar. Each bar bracket 192-u, 192-l extends distally and orthogonally from the respective ramp bar toward a proximal side 174-p, 176-p of the respective pedestal 174,176 (FIG. 5).

A distal portion of each bar bracket 192-u and 192-l is laminarly mounted to a proximal free end of a respective one of spaced apart thin, planar resilient upper bar spring sheets 194-u and thin, planar resilient lower bar spring sheets 194-l (FIG. 6). The other distal end of each sheet 194-u and 194-l is sized and shaped to be fitted rigidly into one of a set of spaced apart, correspondingly thin passages 196 (FIG. 3 dashed lines) formed in the body of the respective pedestal 174, 176. The passages 196 are shaped and dimensioned to each receive the one respective distal end of corresponding sheet 194-u, 194-l to be mounted rigidly therein. The spring sheets 194-u and 194-l may include a resilient berryllium/copper material.

The distal portion of each bar bracket 192-u and 192-l are secured to respective spring sheets 194-u and 194-l by suitable securing means, for example, rivets or screws. The sheets 194-u, 194-l may be mounted using suitable securing means, for example, pins 152 extending through respective holes formed within the pedestals 174 and 176 and respectively aligned holes formed in the sheets 194-u and 194-l. Each of the set of the passages 196 extend through the body of the respective upper ramp set pedestal 174 and lower ramp set pedestal 176. The passages 196 extend from the one proximal side of the pedestal 174-p, 176-p facing the respective bar brackets 192-u, 192-l, to an opposite distal side 174-d, 176-d.

The fitted end of each spring sheet 194-u and 194-l is disposed parallel to the plane of the disks 108. The fitted end of each spring sheet 194-u and 194-l holds the respective bar brackets 192-u and 192-l and ramp bars 166-u and 166-l in relative parallel relationship.

Each bar bracket 192-u and 192-l terminates at a distal end 193-u and 193-l spaced away from the corresponding proximal side 174-p and 176-p of the facing pedestal. The distal end 193-u and 193-l of each bar bracket is shaped to present an end face essentially parallel to the facing proximal pedestal side 174-p and 176-p. The distal end face 193-u and 193-l of the bracket thereby provides a surface on which a force may be exerted to produce a lever action that is countered by the resilience of the respective spring sheets 194-u and 194-l.

The pedestals 174, 176 include a respective upper pedestal mounting bracket 178 and lower pedestal mounting bracket 180 having respective fastener apertures 182 and 184 therethrough. Pedestal mounting brackets 178 and 189 and base fastener apertures 182 and 184 are configured to mount the ramp assembly 102 to receiving apertures 186 and 188 on the base 104 with pedestal bracket fasteners (such as threaded screws, not shown) so the ramp bar free ends 164 are properly spaced from the respective disk outer perimeters 116 through the associated spring sheets, bar brackets and ramp bars.

Each ramp bar 166-u, 166-l is configured with a respective inclined ramp face 167-u, 167-l extending along the bar from the respective free end 164-u, 164-l and directed radially outward from the disks 108. The dimensions of the pedestals 174, 176, the brackets 178, 189, the location of base mounting apertures 186, 188, the spacing of the springs, brackets and bars along the pedestals 174, 176 are arranged to bring each inclined ramp of the respective bars in close, but offset alignment with a corresponding one of an upper or lower disk surface 110-u, 110-l when first mounted in aligned position on the base 104. The amount and direction of alignment offset of the ramp faces with the related disk surface and head tabs will be discussed further below.

Referring now to FIGS. 9 and 10, each upper ramp face 167-u is disposed on the respective upper bar free end 164-u, inclined with increasing relative displacement from plane of their respective disk surfaces 110-u with increasing distance along tangent 190 directed away from the spindle axis 114. Each lower ramp face 167-l is disposed on the respective lower bar free end 167-l, inclined oppositely with increasing relative displacement from plane of their corresponding disk surfaces 110-l with increasing distance along tangent 190 directed away from the spindle axis 114 (as seen in FIG. 1 and 2). The ramps 167-u, 167-l present an angle, plus or minus θr, with respect to their respective disk surface planes.

A set of upper bar adjusting screws 201-u and a set of lower bar adjusting screws 201-l are each threadably disposed in the respective pedestal 174 and 176. The screws 201-u, 201-l extend through a corresponding one of a set of spaced apart upper bar threaded bore holes 202-u and a corresponding one of a set of spaced apart lower bar threaded bore holes 202-l provided therethrough. The bore holes 202-u and 202-l are each disposed adjacently offset from and parallel to a respective one of the spring sheets 194-u, 194-l. The bore holes 202-u, 202-l are offset in the same direction from the adjacent spring sheet 194-u, 194-l as are a corresponding one of the bar bracket ends of a corresponding ramp bar 166-u, 166-l. The amount of bore hole offset is arranged so that the respective adjusting screw is aligned with the one respective bracket end face 193-u, 193-l.

The screws 201-u and 201-l have a respective slotted head end 200-u and 200-l and a respective opposed butt end 203-u and 203-l. The slotted ends 200-u, 200-l of the adjusting screws are disposed on respective sides of the pedestal 174-d and 176-d distal to the bar bracket end faces 193-u and 193-l of the bar bracket supported by respective adjacent spring sheet 194-u and 194-l. The butt end 203-u, 203-l of each screw extends from the proximal sides 174-p, 176-p of the respective pedestal proximally toward the respective bar bracket end faces 193-u, 194-l. The slotted end 200-u, 200-l of each screw is provided with sufficient free play between the slotted end and the distal pedestal side 174-d, 176-d that the butt end 200-u, 200-l of the screw can be brought into abutting relation ship with a respective bar bracket end face 193-u, 194-l. Additionally, the free play of the slotted end is arranged to be large enough to advance a respective screw 201-u, 201-l toward or away from the pedestal 174, 176 while the screw butt end 203-u, 203-l is in contact with a respective bar bracket end face 193-u, 193-l, sufficient to position the corresponding ramp face 167-u, 167-l to a desired position relative to the free end of a respective associated tab 162-u, 162-l.

Figure 9A:
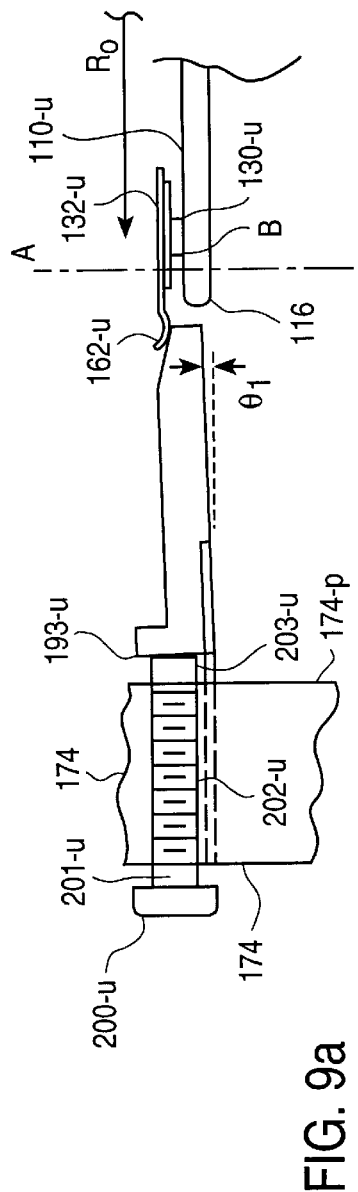
FIGS. 9-*a* through 9-*c* are three successive elevation views of the effect of mechanical tolerance built-up to initial contact point and the adjustment possible to bring the contact point to nominal.
Figure 9B:
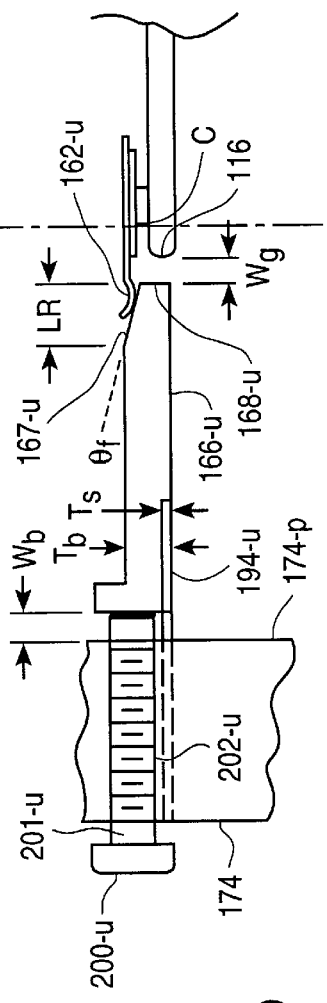
Figure 9C:
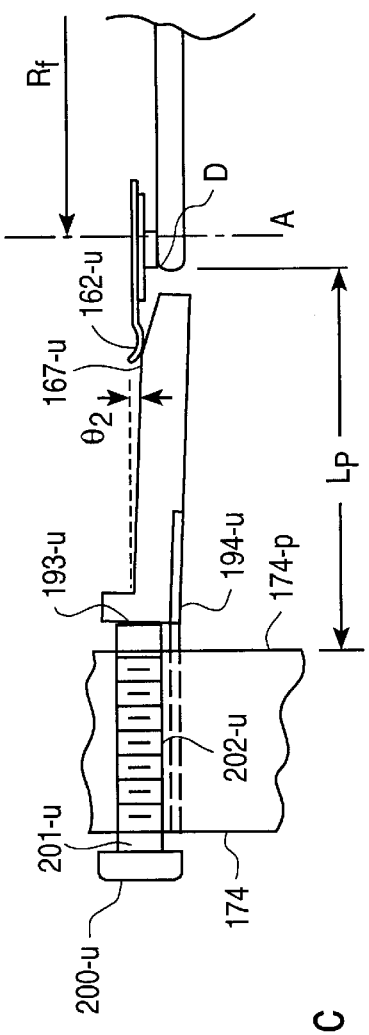

In normal operation, the dimensions of the pedestals, spring sheets, brackets, bars and tabs are arranged so that the ramp faces 167-u, 167-l will be aligned to within the manufacturing tolerances with the respective tab free ends 162-u, 162-l as the heads 130-u, 130-l approach the perimeter of the disks under positioning control of the actuator assembly driven by the voice coil. This nominal operation point is shown in FIG. 9b, while FIGS. 9a and 9c show possible inaccuracies before adjustment; the angles θ1 and θ2 show the nominal adjustment. In FIG. 9a, the initial contact point is at "B", inside of a nominal radial location at "A—A." Note that the space between B and A—A cannot be used, and therefore results in a loss in data storage capacity. In FIG. 9c the opposite condition is shown, with the initial contact point at point "D" at an undesirably close position to the outside edge of the disk. At point D because the air bearing is not stable, possible "head crashes" may occur. In FIG. 9b an optimal adjustment position is illustrated. Lp is the spacing between the proximal face 174-p of the pedestal 174-u and the perimeter 116 of the disks 108. Tb is the thickness of the ramp bar 166-u. Wb is the spacing from the distal bar end 193-u to the proximal face of the pedestal 174-u. Ts is the thickness of the spring sheet 194-u.

The torque and total energy required to load and unload the heads 130 to and from the respective disk surfaces 110 will be a function of the ramp angle, θr, the number of heads 130 and the coefficient of friction between the tab ends 162 and ramp faces 167. The opposition requirement is the accuracy of the landing point. Experience has shown a ramp angle of 10 to 20 degrees provides the best balance of the aforementioned requirements.

Figure 10A:
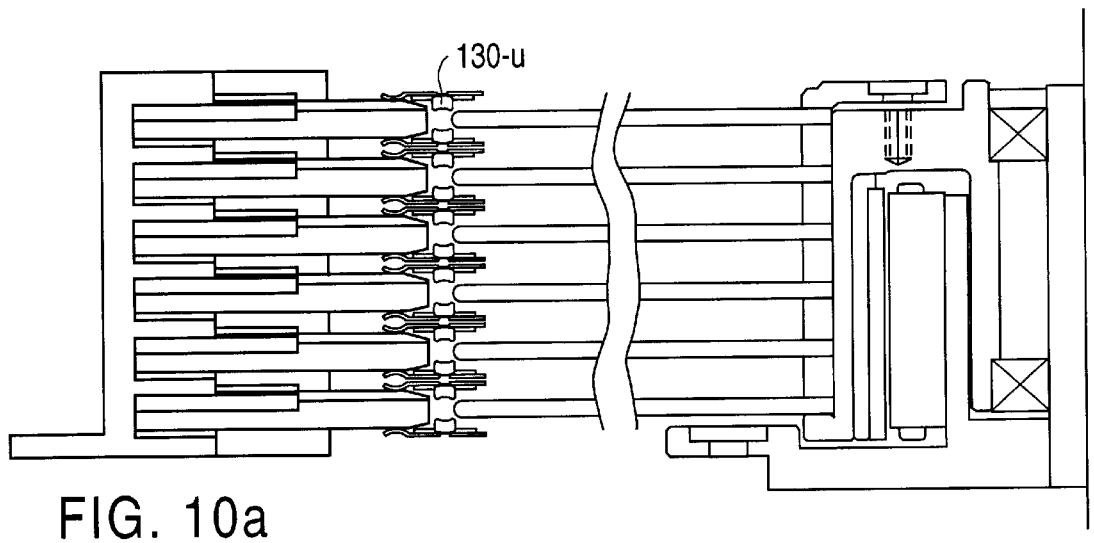
FIGS. 10-*a* through 10-*c* are three successive elevation views of the ramp bar members in relation to the respective free tab of one embodiment of the present invention.
Figure 10B:
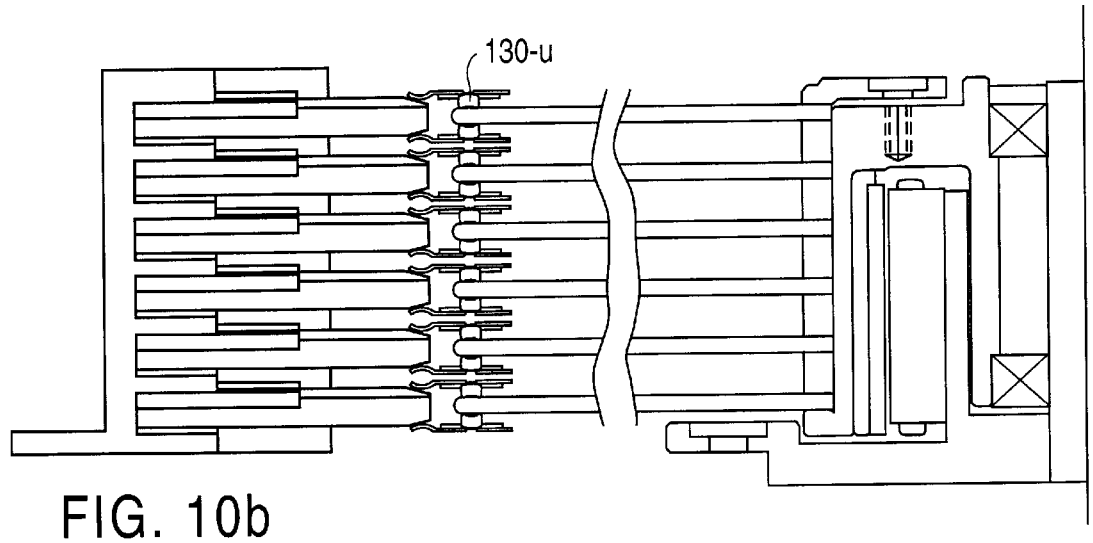
Figure 10C:
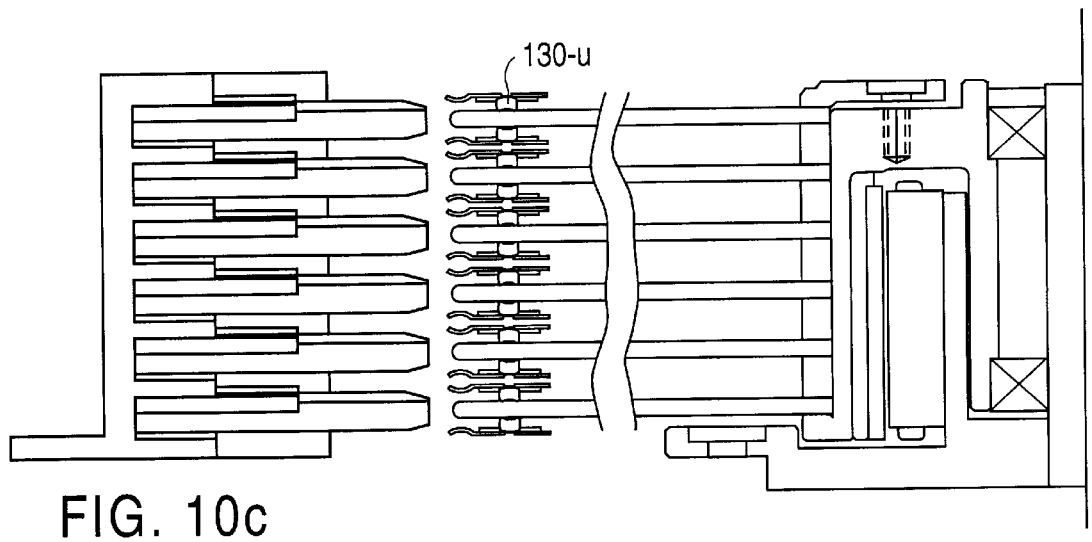

FIGS. 10a–10c are three successive elevation views of the ramp bar members in relation to the respective free tab of one embodiment of the present invention; viz, a) when the heads are in the normal operating position, not in contact with the ramp bar members; b) with the head at the landing point and beginning to lift away from the disk surface; and c) with the head displaced at a safe head to disk spacing.

Since the adjustable loading/unloading ramps of the present invention are located completely outside the outer perimeter of the data storage disks, the present invention lends itself to removable disk storage applications. The adjustable loading/unloading ramps may be pre-adjusted on a separate calibration fixture for subsequent inclusion during manufacturing assembly. This is beneficial because interference with installation of other components (i.e., disks) is minimized. The present invention also provides a head loading/unloading system which minimizes interdisk spacing in multiple disk data storage systems.

This invention also provides a head loading/unloading system which minimizes wasted data tracks at the perimeter of the disks, easily compensating for the build up of manufacturing tolerances of the head, disk and loading/unloading mechanism in multiple disk data storage systems. The invention permits independent adjustment of a plurality of heads relative to their respective loading/unloading location on the perimeter of the disks.

The design freedom for selection of recording media is expanded, since head/disk contact does not occur at any point in normal operation, or normal or power off shutdown. No special anti-friction, anti-wear or lubrication coatings are required. Problems of head/disk stiction with the attendant required increase in actuator motor power are eliminated.

While the foregoing detailed description has described an embodiment of the present invention, it is to be understood that the above description is illustrative only and not limiting of the disclosed invention. It will be appreciated that it would be possible to modify the size, shape orientation and appearance and methods of manufacture of various elements of the invention or to include or exclude various elements within the scope and spirit of this invention. For example, the base, pedestals, screws, bars and springs may be made of suitable rigid materials such as metal, plastic, ceramic and may be cast, machined, molded and or stamped. It is contemplated that some of the elements described as separate elements could be combined in a unitary manner by casting or molding. For example, the pedestals, springs and ramp bars and bar brackets may be molded as one piece with integral ramp faces, requiring only an adjusting screw installed therein. Also, the angular relationship between the adjust screws 201-u and 201-l and the ramp bars 166-u and 166-l could be inline rather than 90 degrees as shown in FIG. 5.

The tab may be a separate member fixed to the head, suspension or arm by a fastener or adhesive, or may be an integral part of a stamped or molded suspension or arm member. The tab may also be an integral part of the head. The tab enables the upper and lower ramps to be positioned so as not to physically interfere with the disks, consequently, a closer disk to disk spacing is possible; for example, in an exemplary embodiment, a disk to disk spacing of 0.182 inches.

It is understood that the present invention can find utility in a variety of environments, for example, magnetic disk drives, optical disk drive, and magneto-optical disk drives. Therefore, although the present invention has been described herein with reference to particular embodiments thereof, a latitude of modification, various changes and substitutions are intended in the foregoing disclosure, and it will be appreciated that in some instances some features of the invention will be employed without a corresponding use of other features without departure from the scope of the invention as set forth.

What is claimed is:

1. A data storage system, comprising:

a rotatable data storage disk with at least one data storage surface and an outer circumference;

a head for interacting with the data storage surface;

a tab coupled to the head;

a head positioning member coupled to the head, for moving the head substantially parallel to the data storage surface to different radial locations relative to the center of the data storage disk;

a ramp face for slidably receiving the tab as the head positioning member moves the head to an unloading radial location relative to the data storage disk, the ramp face disposed to restrain the head from the data storage surface while the tab is in contact with the ramp face;

a ramp assembly coupled to the ramp face, for holding the ramp face at a fixed ramp face location, which fixed ramp face location is radially outward from the outer circumference of the data storage disk; and an adjustment device coupled to the ramp assembly for adjusting the ramp face to the fixed ramp face location.

2. The system of claim 1, wherein the head interacts with the storage surface by writing information thereto.

3. The system of claim 1, wherein the head interacts with the storage surface by reading information therefrom.

4. The system of claim 1, wherein the fixed ramp face location is positioned such that when the ramp face slidably receives the tab at the fixed ramp face location, the head is vertically displaced from the data storage surface by at least a predetermined displacement distance.

5. The system of claim 1, wherein the fixed ramp face location is positioned such that when the ramp face slidably receives the tab at the fixed ramp face location, the head is located at a predetermined radially outermost data transfer position.

6. The system of claim 1, wherein the adjustment device allows the ramp face to be adjusted in a direction which is parallel to the data storage surface.

7. The system of claim 1, wherein the adjustment device allows the ramp face to be adjusted in a direction which is perpendicular to the data storage surface.

8. The system of claim 1, wherein the head interacts with the data storage surface while the data storage disk is rotating and the head is flying adjacent to the data storage surface.

9. A data storage system, comprising:

a plurality of rotatable data storage disks, each data storage disk having at least one data storage surface and an outer circumference;

for each data storage surface, a head associated with the data storage surface for interacting with the data storage surface;

for each heads, a tab coupled to the head;

a head positioning member coupled to each of the heads, for moving the heads substantially parallel to the data storage surfaces;

for each head, an associated ramp face for slidably receiving the tab coupled to the head as the head positioning member moves the head to an unloading radial location relative to the data storage disks, the ramp face disposed to restrain the head from the associated data storage surface while the tab is in contact with the ramp face;

a ramp assembly coupled to the ramp faces, for holding each ramp face at an associated fixed ramp face location, which fixed ramp face location is radially outward from the outer circumference of the data storage disk; and an adjustment device coupled to the ramp assembly, for adjusting the ramp face to the associated fixed ramp face location.

10. The system of claim 9, wherein each fixed ramp face location is positioned such that when the associated ramp face slidably receives the tab at the fixed ramp face location, the head is vertically displaced from the data storage surface by at least a predetermined displacement distance.

11. The system of claim 9, wherein each fixed ramp face location is positioned such that when the associated ramp face slidably receives the tab at the fixed ramp face location, the head is located at a predetermined radially outermost data transfer position.

12. In a data storage system including a circular rotatable data storage surface, a head for interacting with the data storage surface, and a head positioning member coupled to the head, a head loading/unloading apparatus comprising:

a ramp face for slidably engaging the head as the head positioning member moves the head to an unloading radial location relative to the data storage surface, the ramp face disposed to restrain the head from the data storage surface while engaging the head;

a ramp assembly coupled to the ramp face, for holding the ramp face at a fixed ramp face location, which fixed ramp face location is radially outward from the outer circumference of the data storage surface; and an adjustment device for adjusting the ramp face to the fixed ramp face location.

13. The system of claim 12, further comprising:

a tab coupled to the head, for contacting the ramp face and transmitting a restraining force to the head when the ramp face slidably engages the head.

14. The system of claim 12, wherein the fixed ramp face location is positioned such that when the ramp face slidably engages the head at the fixed ramp face location, the head is vertically displaced from the data storage surface by at least a predetermined displacement distance.

15. The system of claim 12, wherein the fixed ramp face location is positioned such that when the ramp face slidably engages the head at the fixed ramp face location, the head is located at a predetermined radially outermost data transfer position.

16. The system of claim 12, wherein the adjustment device allows the ramp face to be adjusted in a direction which is parallel to the data storage surface.

17. The system of claim 12, wherein the adjustment device allows the ramp face to be adjusted in a direction which is perpendicular to the data storage surface.

18. The system of claim 12, wherein the head interacts with the storage surface by writing information thereto.

19. The system of claim 12, wherein the head interacts with the storage surface by reading information therefrom.

20. The system of claim 12, wherein the head interacts with the data storage surface while the data storage surface is rotating and the head is flying adjacent to the data storage surface.

21. In a data storage system including a plurality of circular rotatable data storage surfaces, a head for interacting with each data storage surface, and a head positioning mezriber coupled to each head, a head loading/unloading apparatus comprising:

for each head, a ramp face for slidably engaging the head as the associated head positioning member moves the head to an unloading radial location relative to the associated data storage surface, the ramp face disposed to restrain the head from the data storage surface while engaging the head;

for each ramp face, a ramp assembly coupled to the ramp face, for holding the ramp face at an associated fixed ramp face location, which fixed ramp face location is radially outward from the outer circumference of the associated data storage surface; and for each ramp assembly, an adjustment device for adjusting the associated ramp face to the associated fixed ramp face location.

22. The system of claim 21, further comprising:

for each head, a tab coupled to the head, for contacting the ramp face associated with the head and transmitting a restraining force to the head when the ramp face slidably engages the head.

23. The system of claim 21, wherein each fixed ramp face location is positioned such that when the associated ramp face slidably engages the associated head at the fixed ramp face location, the head is vertically displaced from the associated data storage surface by at least a predetermined displacement distance.

24. The system of claim 21, wherein each fixed ramp face location is positioned such that when the associated ramp face slidably engages the associated head at the fixed ramp face location, the head is located at a predetermined radially outermost data transfer position.

25. The system of claim 21, wherein each adjustment device allows the associated ramp face to be adjusted in a direction which is parallel to the associated data storage surface.

26. The system of claim 21, wherein each adjustment device allows the associated ramp face to be adjusted in a direction which is perpendicular to the associated data storage surface.

27. The system of claim 21, wherein the each head interacts with the associated data storage surface by writing information thereto.

28. The system of claim 21, wherein each head interacts with the associated data storage surface by reading information therefrom.

29. The system of claim 21, wherein each head interacts with the associated data storage surface while the associated data storage surface is rotating and the head is flying adjacent to the data storage surface.

* * * * *

UNITED STATES PATENT AND TRADEMARK OFFICE
CERTIFICATE OF CORRECTION

PATENT NO. : 5,875,074

DATED : February 23, 1999

INVENTOR(S) :
Bin-Lun Ho and Vinod K. Rao

It is certified that error appears in the above-identified patent and that said Letters Patent is hereby corrected as shown below:

On the title page, item [73] change the assignee to read:

Seagate Technology, Inc., Scotts Valley, Calif.

Signed and Sealed this

Twenty-seventh Day of July, 1999

Attest:

Q. TODD DICKINSON

*Attesting Officer*   *Acting Commissioner of Patents and Trademarks*